No. 760,147. PATENTED MAY 17, 1904.
C. J. PIGEON.
TIRE FOR VEHICLE WHEELS.
APPLICATION FILED NOV. 17, 1903.
NO MODEL. 2 SHEETS—SHEET 1.

WITNESSES
Henry J. Fuhrbier.
J. Henry Glesser.

INVENTOR
Charles Joseph Pigeon
BY
Gomer Viles
ATTORNEYS

THE NORRIS PETERS CO., PHOTO-LITHO., WASHINGTON, D. C.

No. 760,147. PATENTED MAY 17, 1904.
C. J. PIGEON.
TIRE FOR VEHICLE WHEELS.
APPLICATION FILED NOV. 17, 1903.
NO MODEL. 2 SHEETS—SHEET 2.
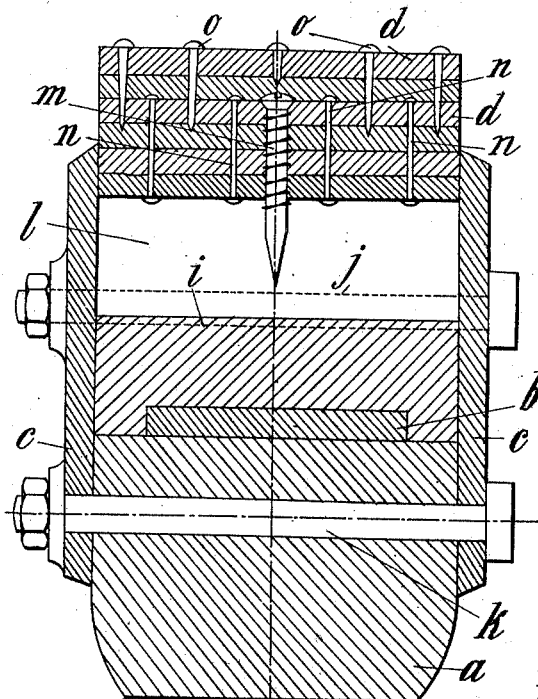
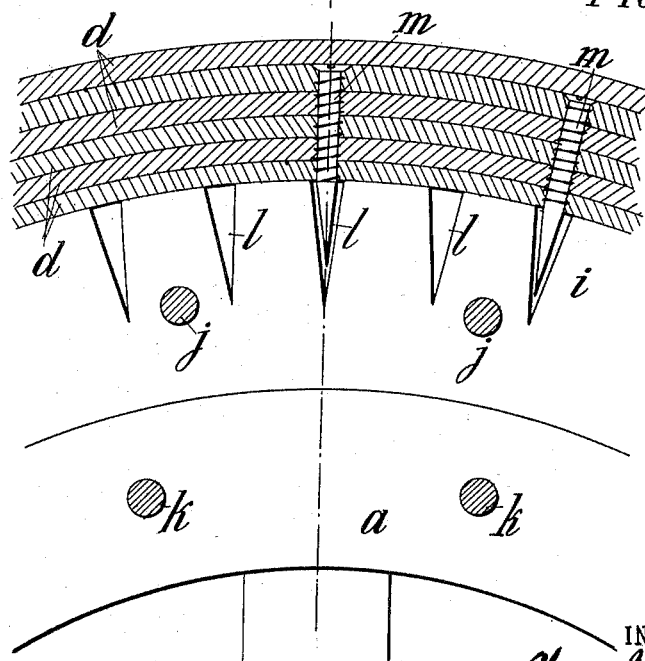
WITNESSES
Henry J. Suhrbier.
J. Henry Glesser.
INVENTOR
Charles Joseph Pigeon
BY
Jamex Viles
ATTORNEYS No. 760,147.  
Patented May 17, 1904.

UNITED STATES PATENT OFFICE.

CHARLES JOSEPH PIGEON, OF PARIS, FRANCE.

TIRE FOR VEHICLE-WHEELS.

SPECIFICATION forming part of Letters Patent No. 760,147, dated May 17, 1904.

Application filed November 17, 1903. Serial No. 181,478. (No model.)

*To all whom it may concern:*

Be it known that I, CHARLES JOSEPH PIGEON, a citizen of the Republic of France, residing in Paris, in the Republic of France, have invented certain new and useful Improvements in Tires for Vehicle-Wheels, of which the following is a specification.

This invention has for its object a tire which is intended to replace pneumatic tires hitherto applied to the wheels of bicycles, motor-vehicles, and the like.

The inconveniences attendant upon the employment of pneumatic tires are well known, more especially in the case of motor-vehicles. The cost price is very high, while they rapidly deteriorate and necessitate lengthy stoppages en route for repairs, &c. The tire hereinafter described obviates these defects completely owing to its simple and strong construction.

The tire which forms the subject of this invention is illustrated, by way of example, in the accompanying drawings, in which—

Figure 1:
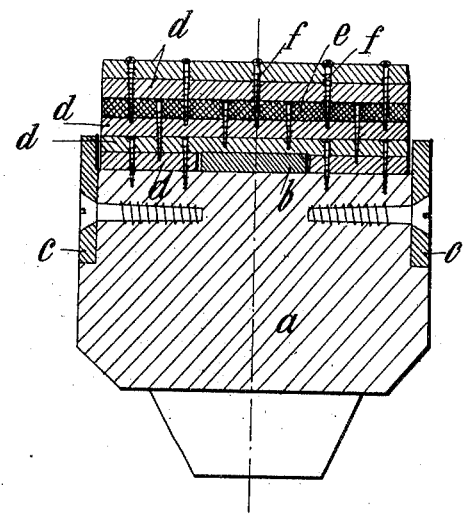
Figure 2:
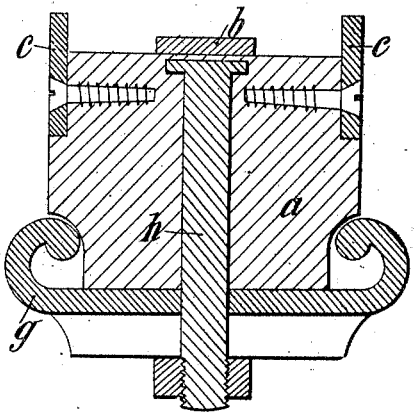

Figure 1 is a section through the said tire. Fig. 2 relates to a modification. Figs. 3 and 4 are respectively a cross-section and a longitudinal section of another form of the tire.

This tire may be constructed in its entirety, Fig. 1, or applied with some slight modifications to existing rims, Fig. 2. In either case the tire is adapted to a wooden rim $a$ in one or more pieces. The rim $a$ is hooped by an upper circle $b$, of iron, and two lateral circles $c$, screwed into recesses in the rim, and thus forming a housing for the base of the tire. Upon the rib so formed circles of leather $d$ and of india-rubber $e$ are arranged, these being sewed together or fixed by screws $f$ or nails, first of all upon the wooden rim and then leather upon leather or india-rubber.

The tire may be solely constituted by circles of leather $d$, or it may comprise a thickness of india-rubber $e$ interposed, Fig. 1, or, again, it may be composed in the following manner: a circle of leather, a circle of india-rubber, a circle of leather, a circle of india-rubber, and so on. Obviously the rim may also be of iron without a hoop $b$, but solely the lateral cheeks $c$, rising higher for the reception of the tire, the elements of which (leather and india-rubber) are sewed, nailed, or screwed. The said tire may be stuck or screwed to the rim.

The form of tire described above presents the further advantage of being applicable to all wheels suited for the reception of pneumatic tires, particularly to motor-vehicle wheels, by inserting it in the rim $g$, Fig. 2. The circle $a$ may be retained upon the rim $g$ by bolts $h$ or in any appropriate manner.

In Figs. 3 and 4, relating to a modification, the tire is still adapted upon a wooden rim $a$ made in one or more parts. This rim $a$ is provided with an iron hoop $b$. Two other lateral circles $c$ constitute cheeks forming a housing for the reception of the base of the tire.

The base of the tire is constituted by the thickness of a solid or hollow crown of india-rubber $i$, which is provided with an internal circular recess in which the hoop $b$ is lodged. The crown $i$ is made one with the rim $a$, by means of bolts $j$, which traverse the two lateral members $c$, and also the thickness of the india-rubber, these two lateral members being themselves fixed to the rim by bolts $k$. The crown $i$ is provided with transverse slits or notches $l$, into which the extremities of screws $m$ enter, these being screwed and embedded in the thicknesses of leather $d$. Nevertheless, the different thicknesses of leather $d$, connected one with the other either by rivets $n$, Fig. 3, or by any other appropriate means, by means of screws, nails, seams, or the like, are stuck by the inner thickness of leather upon the crown of india-rubber. The introduction of screws $m$ into the notches $l$ is only a precautionary measure in case for any reason the crown $i$ and the thicknesses of leather $d$ should become unstuck. Finally, in order to prevent the outer thickness of leather of the tire from wearing too rapidly, and more especially in order to obviate slipping or skidding, a certain number of round, conical, or other headed nails $o$, Fig. 3, may be driven into the thicknesses of leather $d$ of the different types of tire which have been described. The nails $o$ also assist in preserving the connection of the different thicknesses of leather.

The form of tire represented as a modification in Figs. 3 and 4 has been devised for the purpose of obtaining a tire giving a maximum of elasticity combined with the maximum of strength. It will be obvious from the foregoing description that this desideratum has been realized, first, by the interposition between the circles of leather and the wooden rim of the wheel of a crown of india-rubber, either solid or hollow, but in any event of considerable thickness, in such a manner as to impart to the tire the desired elasticity, which would not be given to it by the circles of india-rubber of small thickness interposed between the circles of leather, Fig. 1; second, by the formation of transverse cuts in the external portion of the india-rubber crown, these cuts or notches doubling the elasticity of the crown of solid or hollow rubber and at the same time serving, owing to the penetration of the screws fixed in the thicknesses of leather, to prevent any creeping of the assemblage formed by the circles of leather upon the rubber tire, because, although these members are stuck together, moisture or a shock might produce partial or total separation.

What I claim, and desire to secure by Letters Patent of the United States, is—

1. A tire for vehicle-wheels, consisting in the combination of a felly hooped exteriorly on its sides and on its periphery with metallic plates, circles of leather and india-rubber superposed on the said felly and fastened together and to the felly by means of rivets or bolts with heads projecting on the exterior periphery of the tire, substantially as described.

2. In a vehicle-tire, the combination with a felly hooped exteriorly on its sides and on its periphery with metallic plates, of a block of india-rubber held between said plates by means of bolts, circles of leather and india-rubber superposed over said block, said circles being united by fastenings having exteriorly-projecting heads, and secured to said block by penetrating fastening members.

3. In a tire for vehicle-wheels, the combination with a felly hooped exteriorly on its sides and on its periphery with metallic plates, of a block of india-rubber having transverse tapering slots therein held between said plates, circles of resilient material superposed over said block, said circles being united by fastenings having exteriorly - projecting heads and secured to said block by means of screws penetrating the slits in the same.

In testimony whereof I have signed this specification in the presence of two subscribing witnesses.

CHARLES JOSEPH PIGEON.

Witnesses:
   EMILE LEDRET,
   AUGUSTUS E. INGRAM.